(12) United States Patent
Falcey

(10) Patent No.: US 8,752,379 B2
(45) Date of Patent: Jun. 17, 2014

(54) HYBRID SOLAR/NON-SOLAR ENERGY GENERATION SYSTEM AND METHOD

(76) Inventor: Jonathan Michael Phillips Falcey, Denver, CO (US)

(*) Notice: Subject to any disclaimer, the term of this patent is extended or adjusted under 35 U.S.C. 154(b) by 352 days.

(21) Appl. No.: 13/317,473

(22) Filed: Oct. 19, 2011

(65) Prior Publication Data

US 2013/0098036 A1 Apr. 25, 2013

(51) Int. Cl.
*F01K 27/00* (2006.01)
*F01K 13/00* (2006.01)

(52) U.S. Cl.
USPC ......... 60/641.15; 60/641.8; 60/676; 126/616; 126/683; 126/685

(58) Field of Classification Search
USPC ............ 60/641.8–641.15, 676; 126/609, 616, 126/683, 685
See application file for complete search history.

(56) References Cited

U.S. PATENT DOCUMENTS

| | | | |
|---|---|---|---|
| 2,987,961 A | 6/1961 | Cotton et al. | |
| 4,026,267 A | 5/1977 | Coleman | |
| 4,055,948 A | 11/1977 | Krausm et al. | |
| 4,139,286 A | 2/1979 | Hein et al. | |
| 4,167,856 A | 9/1979 | Seidel et al. | |
| 4,201,197 A | 5/1980 | Dismer | |
| 4,243,019 A | 1/1981 | Severson | |
| 4,256,088 A | 3/1981 | Vindum | |
| 4,281,640 A * | 8/1981 | Wells | 126/692 |
| 4,373,514 A | 2/1983 | Lois | |
| 4,500,167 A | 2/1985 | Mori | |
| 4,509,104 A | 4/1985 | Suzuki et al. | |
| 4,741,609 A | 5/1988 | Sallis | |
| 5,417,052 A | 5/1995 | Bharathan et al. | |
| 5,581,447 A | 12/1996 | Raasakka | |
| 5,727,108 A | 3/1998 | Hed | |
| 6,899,097 B1 * | 5/2005 | Mecham | 126/591 |
| 6,984,050 B2 | 1/2006 | Nakamura | |
| 6,986,591 B2 | 1/2006 | Pate | |
| 7,281,381 B2 * | 10/2007 | Johnson | 60/641.15 |
| 7,435,010 B2 | 10/2008 | Gauthier et al. | |
| 7,558,452 B2 | 7/2009 | Ho | |
| 7,606,456 B2 | 10/2009 | Nyhart, Jr. | |
| 7,640,746 B2 | 1/2010 | Skowronski | |
| 8,209,984 B2 * | 7/2012 | Penciu | 60/641.15 |
| 2005/0039791 A1 | 2/2005 | Johnson | |
| 2006/0010867 A1 * | 1/2006 | Shaw | 60/641.8 |
| 2006/0260314 A1 | 11/2006 | Kincaid et al. | |
| 2009/0255253 A1 * | 10/2009 | Penciu | 60/641.15 |
| 2011/0131988 A1 | 6/2011 | Sampson et al. | |

OTHER PUBLICATIONS

"PS 10", Solar Power and Chemical Energy Systems, iea Energy Technology Network, SolarPaces, http://www.solarpaces.org/Tasks/Task1/ps10.htm, Jul. 1, 2011-Dec. 31, 2005, 2 pages.

(Continued)

*Primary Examiner* — Hoang Nguyen
(74) *Attorney, Agent, or Firm* — Baker & Hostetler LLP

(57) ABSTRACT

A hybrid solar/non-solar thermal generation system includes a solar concentrator and collector, and fiber optic cables that transfer collected solar radiation to a solar to thermal converter. The solar to thermal converter converts the solar radiation to heat that is used to augment the heating of a working fluid in a boiler. The system has particular application for use in Rankine cycle power generation plants that employ non-solar sources to heat the working fluid.

20 Claims, 8 Drawing Sheets

(56) References Cited

OTHER PUBLICATIONS

"PS 20 Solar Power Plant in Andalusia, Spain", Solar Cells Update, http://solarcellssale.info/solar-science/solar-power-station/ps20-solar-power-plant-andalusia.html, © 2010, 4 pages.
Solar Energy Solar Tres Power Tower (CSP), Renewable Energy Development, http://renewableenergydev.com/red/solar-energy-solar-tres-power-tower-csp/, Mar. 19, 2008, 5 pages.
"Solar One and Two (Now Defunct)", Solaripedia, http://www.solaripedia.com/13/31/solar_one_and_two_(now_defunct).html, © 2008-2011, 4 pages.
"Solar One Concentrated Solar Power (CSP) Plant, United States of America", power-technology.com, Net Resources International, http://www.power-technology.com/projects/solaronesolar, © 2011, 3 pages.
"SunCatcher Pure Power Made Simple", Stirling Energy Systems, http://web.archive.org/web/20110722054449/http:/stirlingeneroy.com/, date accessed Jul. 22, 2011, 1 page.
"The parabolic trough power plants Andasol 1 to 3, The largest solar power plants in the world—Technology premiere in Europe", Solar Millenium, http://www.solarmillennium.de/upload/Download/Technologie/eng/Andaso|1-3engl.pdf, © 2008, 26 pages.
Gonzalez-Aguilar, "Panel 1—Central Receivers PS 10 and PS 20 Power Towers in Seville, Spain", NREL CSP Technology Workshop, Abengoa, http://www.nrel.gov/csp/troughnet/pdfs/2007/osuna_ps10-20_power_towers.pdf, Mar. 7, 2007, 44 pages.
Patel, "Xcel Energy Fires Up Solar/Coal Hybrid Demonstration", Power Business and Technology for the Global Generation Industry, http://www.powermag.com/coal/Xcel-Energy-Fires-Up-SolarCoal-Hybrid-Demonstration_2941.html, Sep. 1, 2010, 3 pages.
Swartley, "Solar Development in the Mojave Desert", Claremont McKenna College, http://scholarship.claremont.edu/cgi/viewcontent.cgi?article=1076&context=cmc_theses&sei-redir=1#search=%22soalr%20one%20mojave%20esert%22, 2010, 60 pages.
International Patent Application No. PCT/US12/60211: International Preliminary Report dated Sep. 26, 2013, 13 pages.
International Patent Application No. PCT/US2012/060211: International Search Report and Written Opinion dated Jan. 18, 2013, 18 pages.

* cited by examiner

HYBRID SOLAR/NON-SOLAR ENERGY GENERATION SYSTEM AND METHOD

TECHNICAL FIELD

The present invention relates generally to hybrid solar/non-solar thermal energy generation systems. More particularly, the present invention relates to a system and method that uses both solar and non-solar generated thermal energy to heat the working fluid in a Rankine cycle power plant.

BACKGROUND

Traditional solar thermal energy generation (STEG) systems utilize reflectors, usually a parabolic mirror or system of mirrors, that concentrate the solar radiation at a focal point. At the focal point, water is super-heated to create steam; the super-heated steam is used to power a turbine, configured in a traditional Rankine cycle, and turn a generator to produce electricity. A STEG system that operates in this manner is significantly less energy efficient than fossil fuel or nuclear power plants. These inefficiencies stem from the inability to harvest a constant and predictable amount of solar radiation due to daily, seasonal, and weather-related fluctuations, and the under-utilization of operational facilities during periods of low solar radiation. A major shortcoming of a traditional STEG system lies in the inability to control electricity output to meet predicted electricity needs. This lowers the value proposition for STEG systems, especially in the electricity generation market.

Newer designs for STEG systems employ concentrated solar radiation focused on a housing filled with a heat transfer fluid (HTF). The HTF has the ability to store thermal energy for use during periods of low solar radiation. These designs, however, require the use of dense molten salts or molten alkali metals for the HTF, which must be located at the top of a tall receiving tower. The HTF must then be pumped through a thermal circuit so that the stored thermal energy can be utilized by the generation facility. These technical challenges increase the capital and maintenance costs of HTF based STEG systems. Storing the energy in the HTF only guarantees power generation for a short period of time, usually hours, and cannot provide power during long periods of cloud cover. Furthermore, these systems are still subject to the seasonal fluctuations of solar radiation. These factors make the storage of thermal energy impractical for large scale penetration into the energy market.

Fossil fuels can be used in power generation plants and can be controlled to meet predicted electricity needs; however, the availability of fossil fuels is limited in nature and will eventually be depleted. Moreover, their use is harmful to the environment and to human health, and, dependence on fossil fuels carries political ramifications.

The hybridization of solar and non-solar technologies is one potential solution to these problems, but current designs have drawbacks. Many prior art hybrid solar thermal systems use a HTF with a heat exchanger. However, such an approach often preheats the working fluid (e.g., water) or performs other secondary heating tasks and do not provide energy directly to the heating vessel (e.g., boiler) that heats the working fluid. As a result, only a small portion of the total energy generated is attributable to the use of solar radiation. For example, Bharathan (U.S. Pat. No. 5,417,052), incorporated herein by reference, teaches a hybrid solar central receiver for a combined cycle power plant including a molten salt HTF to preheat air from the compressor of a gas cycle. However, the requirement of a central receiver, molten salts, and a heat exchanger represent a large infrastructure investment. The hybrid solar central receiver also uses solar generated heat only to preheat air for a natural gas turbine in a secondary heating role.

It is desirable to provide a hybrid solar/non-solar energy generation system and corresponding energy generation method that is highly efficient and address these drawbacks of the prior art.

SUMMARY

There is disclosed an energy generation system and method that heats a working fluid by both solar radiation and a non-solar energy source, such as coal, nuclear fuel, biofuel or natural gas. The solar radiation is collected, transported and directed into a heating vessel (e.g., a boiler), via an optical collection and transmission system. The optical collection system may comprise a solar radiation concentration system, such as parabolic dish or solar trough, that concentrates and focuses solar radiation upon a solar collector. The optical transmission system may comprise a fiber optic system or light tube that transmits solar radiation from the solar collector to a thermal distributor that converts the solar radiation to solar thermal energy. Heat from the thermal distributor is used to augment the heating of the working fluid inside of the boiler, or, if preferred, before entry to the boiler. The system and method described herein can be retrofitted into already operational Rankine cycle-based facilities.

The herein described system and method produces electricity in a more predictable and controllable manner than a traditional STEG system, can run as efficiently as a fossil fuel power generation system, and does not require elaborate structures to support the HTF. In addition, the system and method described herein contributes a larger percentage of solar radiation to the total electricity output as compared to prior art hybrid systems.

DETAILED DESCRIPTION OF ILLUSTRATIVE EMBODIMENTS

Figure 1:
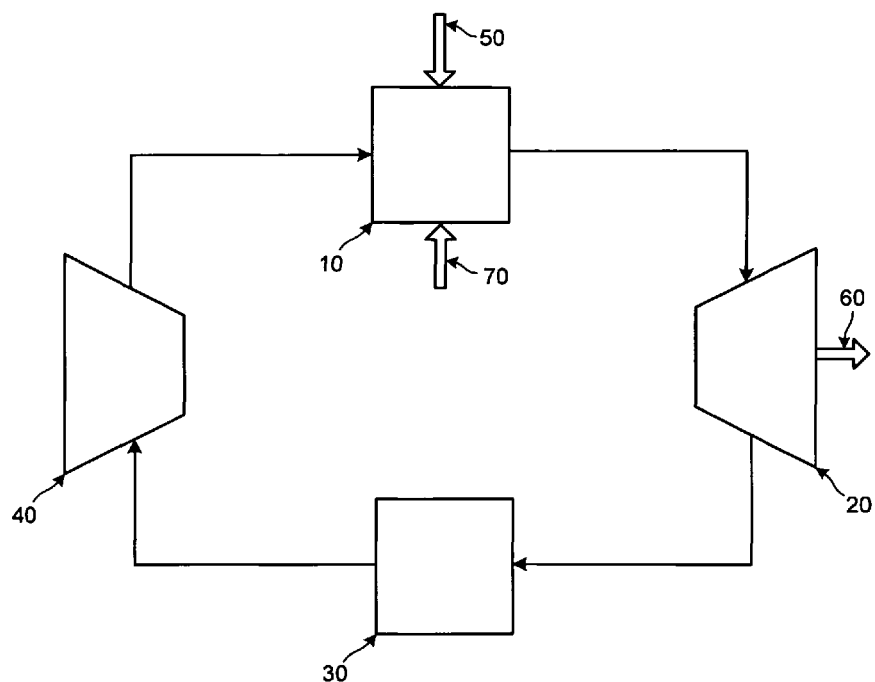
FIG. 1 depicts a simple Rankine cycle power plant in which the invention may be employed.

Referring now to the drawings, wherein like numerals represent like elements, there is illustrated in FIG. 1 a simple well known Rankine cycle power plant in which the invention may be employed. As is common, heat 50 is supplied to a boiler 10, which is used to superheat water ("working fluid") and generate super-heated steam. The superheated steam is supplied to a turbine 20, which produces work 60, ultimately leading to the production of electricity, by turning a generator (not shown). The exhaust steam from the turbine 60, no longer superheated, is fed to a condenser 30 where the steam is converted back into water. The water from condenser 30 is supplied to a pump 40 that pressurizes the water in preparation for superheating in the boiler 10, where the cycle is repeated. According to the invention, heat 50 supplied to the boiler 10 is augmented by thermal energy (heat) 70 generated from solar radiation.

Figure 2:
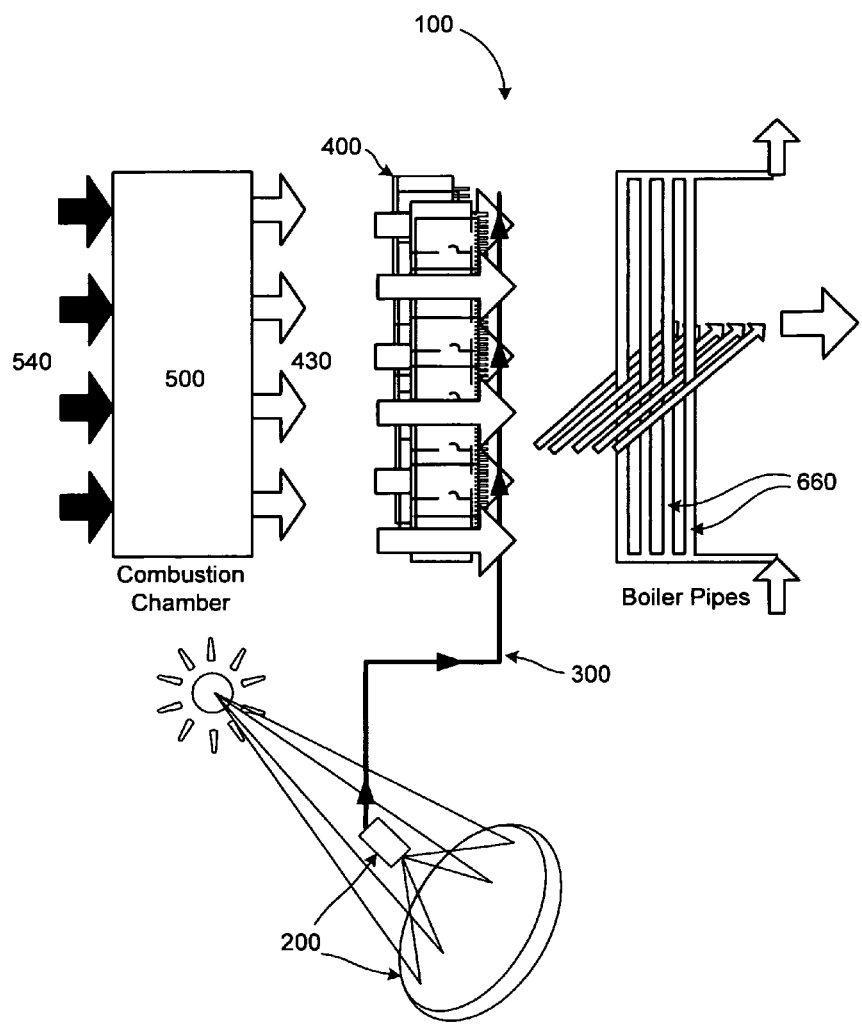
FIG. 2 depicts a hybrid solar thermal system according to an embodiment of the invention.

FIG. 2 illustrates one embodiment of a system for generating and supplying the heat 70. There is provided a hybrid solar/non-solar thermal apparatus 100 comprising a solar radiation concentration subsystem 200, an optical transmission subsystem 300, and a thermal distributor 400, combined with a typical combustion chamber 500 (for generating thermal energy by non-solar means such as coal, oil, nuclear fuel, biofuels, etc.) and boiler pipes 660 for heating the working fluid.

Figure 3:
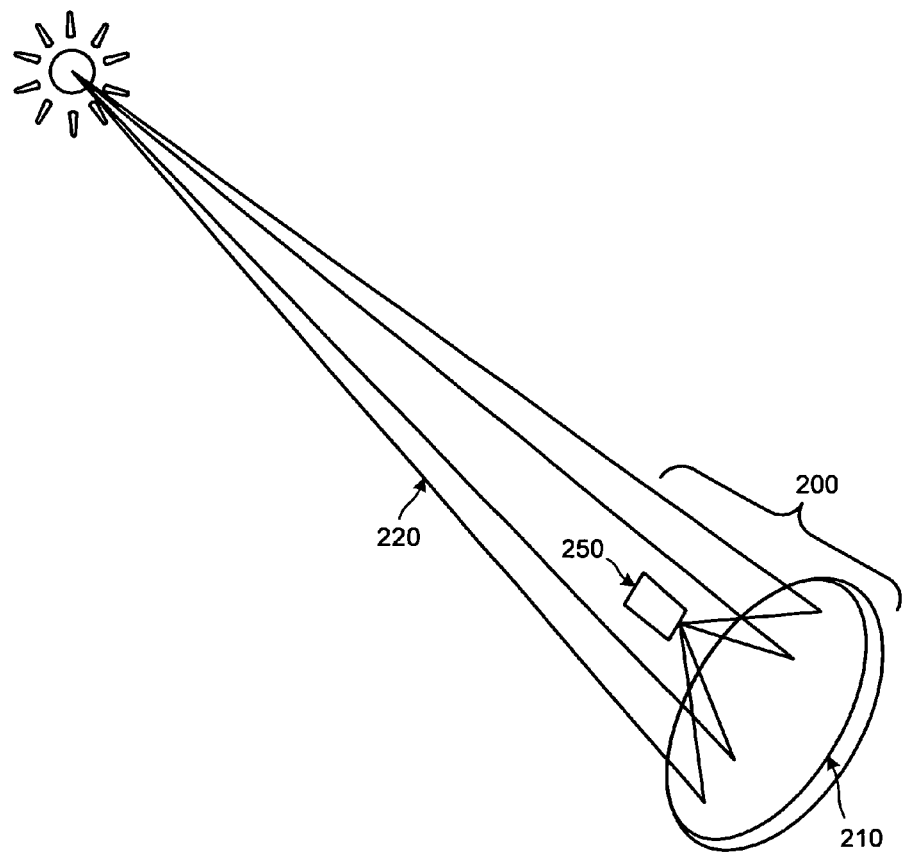
FIG. 3 depicts a parabolic dish concentrator that may be employed in connection with the invention.

The purpose of the solar radiation concentration subsystem 200 is to focus solar radiation that is incident upon a large area and direct it onto a smaller area, thus increasing the amount of watts per square meter of solar radiation. As shown in FIG. 3, one embodiment of the solar radiation concentration subsystem 200 includes a parabolic dish concentrator 210. In a preferred embodiment, the parabolic dish concentrator 210 has a reflective finish that is designed to redirect rays of solar radiation 220 to the focal point of a collector 250. One preferred shape of the parabolic dish concentrator 210 is a circular paraboloid. Parabolic dish concentrators are well known in the art. See, for example, Nakamura (U.S. Pat. No. 6,984,050) and Sallis (U.S. Pat. No. 4,741,609), all of which are incorporated herein by reference. Reference is also made to StirlingSunCatcher™, Stirling Energy Systems, Scottsdale, Ariz. http://www.stirlingenergy.com, also incorporated herein by reference.

Figure 4:
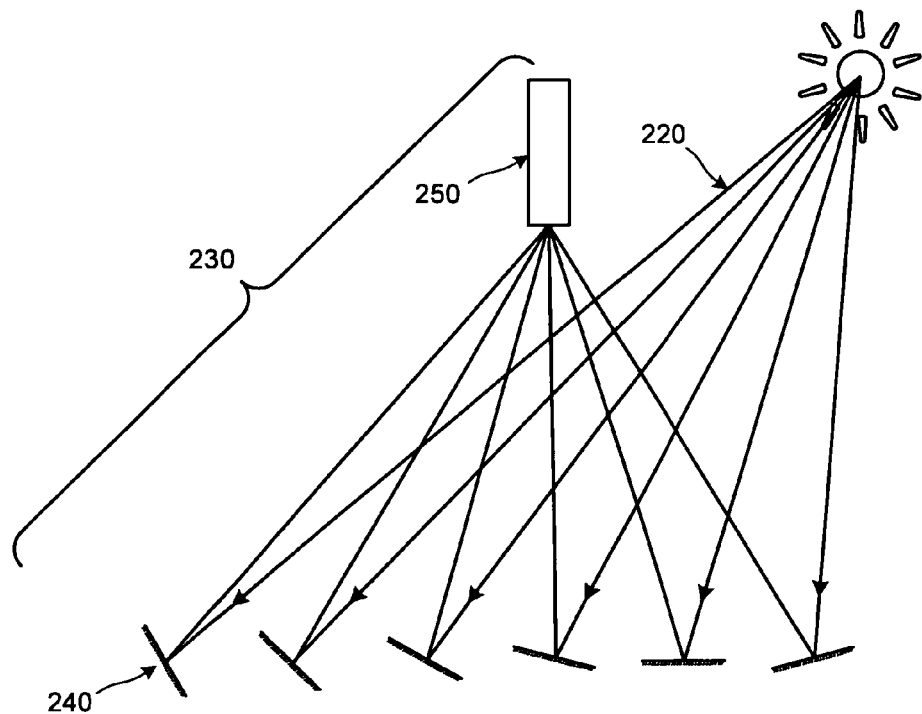
FIG. 4 depicts a central tower system that may be employed in connection with the invention, in lieu of the parabolic dish concentrator.

FIG. 4 illustrates an alternate embodiment of the solar radiation concentration subsystem 200. Instead of a parabolic dish concentrator 210, a central tower subsystem 230 uses heliostats 240 to redirect rays of solar radiation 220 to the focal point of collector 250 sitting atop a tower. The central tower subsystem 230 may comprise plural heliostats 240, each with dual axis control to reflect the rays of solar radiation 220 to collector 250. Tower concentrators are well known in the art. Examples include the Solar One and Solar Two in the Mojave Desert described at a number of web sites including http://www.solaripedia.com/13/31/solar_one_and_two_(now_defunct).html; http://www.power-technology.com/projects/solaronesolar; and, http://scholarship.claremontedu/cgi/viewcontent.cgi?article=1076&context=cmc_theses&sei-redir=1#search=%22soalr%20one%20mojave%20esert%22, all of which are incorporated herein by reference. Other examples include Solar Tres Power, built by Torresol Energy and described, for example at http://renewableenergydev.com/red/solar-energy-solar-tres-power-tower-csp; and the PS10 Solar Power Tower and PS20 Solar Power Tower, developed by ALTAC and described, for example, at http://www.nrel.gov/csp/troughnet/pdfs/2007/osuna_ps10-20_power_towers.pdf; http://www.solarpaces.org/Tasks/Task1/ps10.htm, and http://solarcellssale.info/solar-science/solar-power-station/ps20-solar-power-plant-andalusia.html, all of which are incorporated herein by reference.

In yet another alternative embodiment, a solar trough collector is employed in lieu of a parabolic dish. Solar troughs are well known in the art. See, for example, Severson (U.S. Pat. No. 4,243,019), incorporated herein by reference. Examples of installed solar trough collectors include the Andasol 1 solar power station in Spain built jointly by Solar Millennium AG and ACS Cobra, as described, for example at http://www.solarmillennium.de/upload/Download/Technologie/eng/Andasol1-3engl.pdf; and, http://blog.xcelenergy.com/it%E2%80%99s-the-prius-of-power-plants/, incorporated herein by reference.

Figure 5:
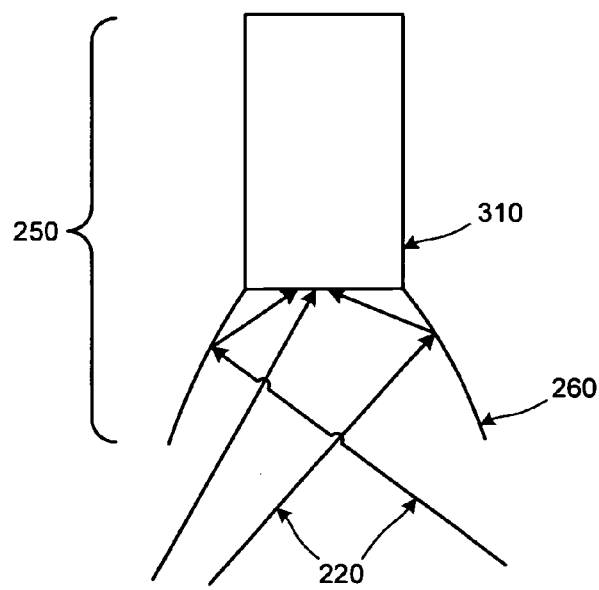
FIG. 5 depicts a solar radiation collection subsystem according to an embodiment of the invention.
Figure 6:
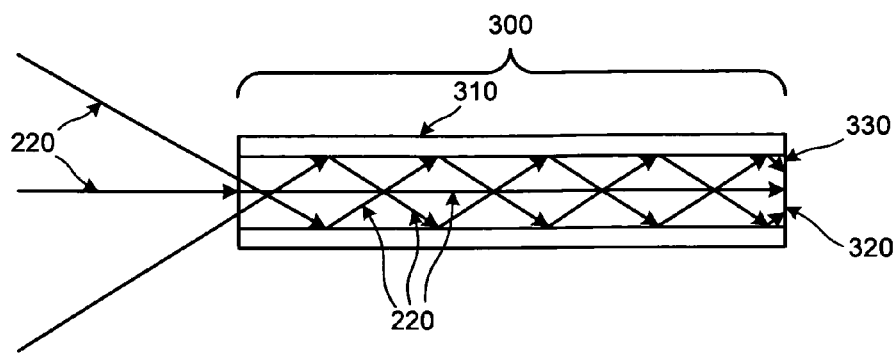
FIG. 6 depicts one embodiment of an optical transmission system according to an embodiment of the invention.

FIGS. 5 and 6 illustrate details of the collector 250. In a preferred embodiment, the collector 250 is made of a compound parabolic concentrator 260. The collector 250 further concentrates and directs the rays 220 into fiber optic cables 310 of an optical transmission subsystem 300, described below. Different methods of concentrating and directing solar radiation through an optical transmission system are well known in the art. See, for example, Dismer (U.S. Pat. No. 4,201,197); Raasakka (U.S. Pat. No. 5,581,447); and, Hed (U.S. Pat. No. 5,727,108), all of which are incorporated herein by reference.

As illustrated in FIG. 6, the optical transmission subsystem 300 functions to transmit the rays 220 of solar radiation as they are collected by the concentrator 260. During transmission through the core 320 of the subsystem 300, the concentrated rays 220 of solar radiation reflect off of cladding 330 of the fiber optic cables 310 as they are transmitted to the thermal distributor 400 (FIG. 2). The fiber optic cables 310 can be a single large cable or a bundle of cables depending on the size of the solar concentrators and the amount of solar radiation that must be carried by the fiber optic cables. The optical transmission subsystem 300 does not require fiber optic cables 310 to function, as alternative structures, including light guides or light tubes, perform a similar function. See, for example, Dismer (U.S. Pat. No. 4,201,197); Hed (U.S. Pat. No. 5,727,108); and, Nyhart (U.S. Pat. No. 7,606,456), all of which are incorporated herein by reference.

Figure 7:
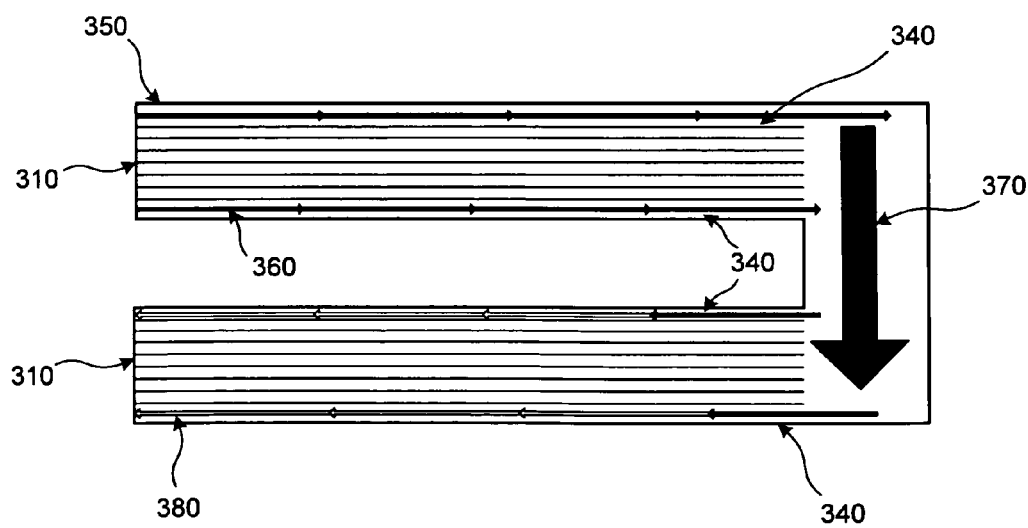
FIG. 7 depicts an internal optical cooling system according to an embodiment of the invention.

The optical transmission subsystem 300 may include an internal optical cooling system, as depicted in FIG. 7. FIG. 7 shows two or more optical fiber cables 310, 310' being employed within a casing 350. The internal optical cooling system operates to keep the fiber optic cables 310, 310' within recommended operating temperature conditions while they transmit the rays of solar radiation 220 to the thermal distributor 400. Most fiber optics are designed to operate at or near room temperature and the temperature inside of the thermal distributor 400 can exceed 500 degrees Celsius. Without a cooling system, the optical fibers could exceed the average temperature in the thermal distributor 400, possibly resulting in inefficient transmission of solar radiation and possibly damaging the fiber optics. In a preferred embodiment, the fiber optic cables 310, 310' are contained within a casing 350. The casing 350 is preferably made of metal. Sufficient space 340 exists between the fiber optic cables 310, 310' and the casing 350 to allow a fluid 360, 370, 380, such as water, to flow through the space 340 to keep the fiber optic cables 310,310' sufficiently cool. At 360, relatively cool fluid is directed through the space 340 over the fiber optic cables 310 by means of a pump (not shown) and, at 370, becomes a relatively warm fluid as it draws heat from and cools the fiber optic cables. The relatively warm fluid 370 follows a return path and cools a second set of fiber optic cables 310' to become a relatively hot fluid 380. The relatively hot fluid 380 then exits the internal optical cooling system. In a preferred embodiment, the hot fluid 380 is used to preheat the working fluid in the Rankine cycle and thereby maintain a higher efficiency. This is done, for example, by feeding the hot fluid 380 into the boiler pipes 660 or to a feed water heater to assist in augmenting the heating of the working fluid. Methods for cooling optical fiber lighting devices have been proposed in the past. See, for example, Suzuki (U.S. Pat. No. 4,509,104), incorporated herein by reference.

Figure 8:
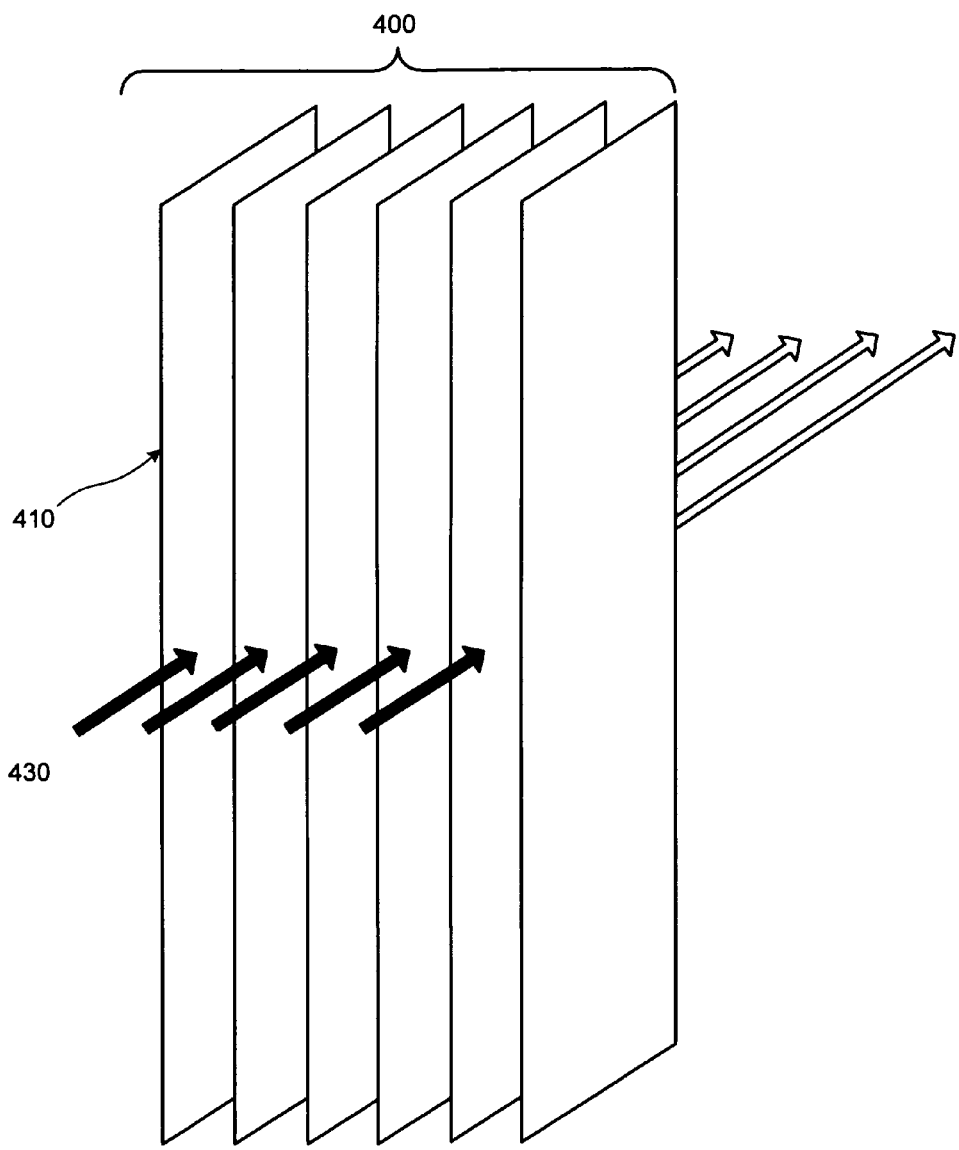
FIG. 8 depicts a thermal distributor according to an embodiment of the invention.
Figure 9:
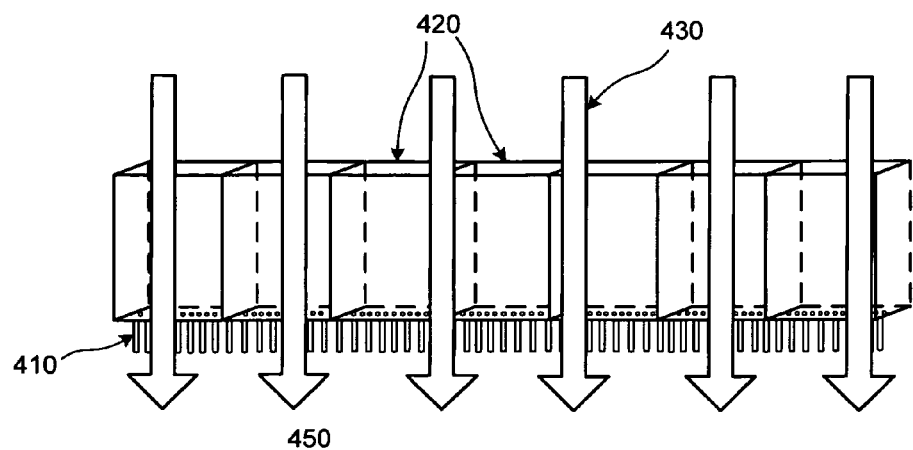
FIG. 9 depicts a heat exchanger fin that may be employed in connection with the thermal distributor.

Details of the thermal distributor 400 are depicted in FIGS. 8 and 9. In a preferred embodiment, and as shown in FIG. 8, the thermal distributor comprises one or more fins 410 positioned in parallel with one another. As shown in FIG. 9, each of the fins 410 is preferably thermally coupled to one or more individual solar-to-thermal converter chambers 420 arranged in parallel. Heated gas 430 from the combustion chamber 500 is directed over the fins 410, so that heat generated in the solar-to-thermal converter chambers 420 is transferred to the gas 430. At entry over the fins 410, the gas 430 is relatively cool but heats up to a temperature sufficient to create superheated steam as it passes over the heated exterior walls of the individual solar-to-thermal converter chambers 420.

Figure 10:
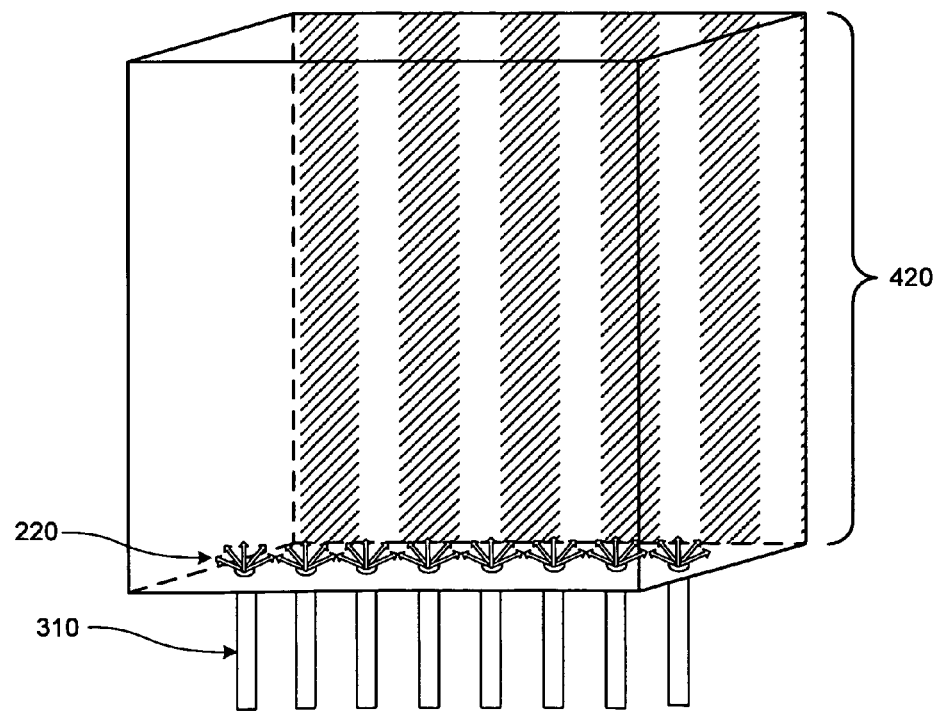
FIG. 10 depicts a solar-to-thermal converter chamber according to an embodiment of the invention.

FIG. 10 depicts one of the solar-to-thermal converter chambers 420. The purpose of the solar-to-thermal converter chamber 420 is to convert the concentrated solar radiation 220 into thermal energy. In a preferred embodiment, the fiber optic cables 310 of the optical transmission subsystem 300 terminate inside the individual solar-to-thermal converter chambers 420 resulting in the concentrated solar radiation 220 being incident on the interior walls of the solar-to-thermal converter chambers 420. The interior walls of the solar-to-thermal converter chambers 420 are preferably made of a material with low reflectivity and high absorption in the spectrum of solar radiation, while readily conducting the thermal radiation through to the exterior wall of the solar-to-thermal converter chamber 420.

Figure 11:
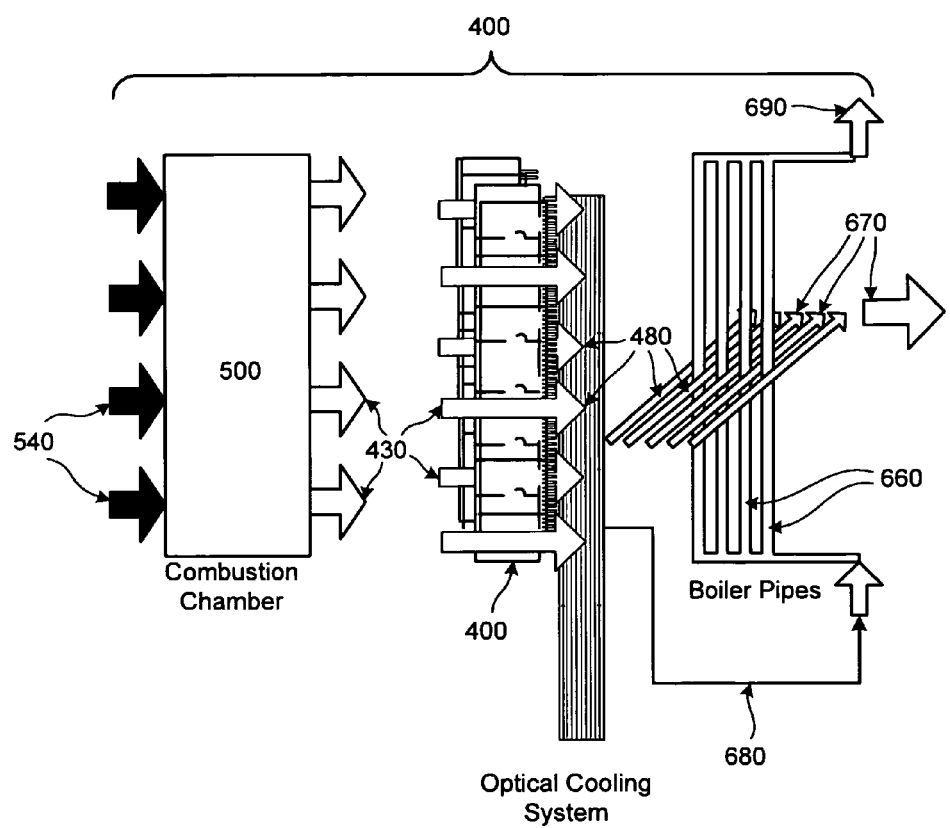
FIG. 11 depicts further details of the hybrid solar thermal system shown in FIG. 1.

FIG. 11 illustrates further details of the hybrid boiler 100. As noted, the combustion chamber 500 typically employs a non-solar fuel source to heat intake air 540 and produce heated exhaust gases 430. The heated exhaust gases 430 are then forced through the thermal distributor 400 where they are further heated. After passing through the thermal distributor 400, the post-heated exhaust gases 480 are forced over boiler pipes 660 and are released as cooled exhaust gases 670. The relatively hot optical cooling system fluid 380 is fed into the boiler pipes 660 via a water pipe 680, so as to further augment the heating of the working fluid. The output of the boiler 100 is fed to the turbine as superheated steam 690. It should be noted that the thermal distributor 400 could be used to pre-heat intake air 540, rather than to (or in addition to) heating the exhaust gases 430. In this scenario, gas 540 would first pass over the fins 410 for a first stage of heating, and then pass to the boiler for a second stage of heating.

There are other methods of accomplishing the solar thermal conversion and heat distribution inside of a boiler or chamber. The optical transmission system 300 could terminate in the walls of the boiler and distribute solar radiation onto the interior walls, exhaust gases, water pipes or any other matter to convert solar radiation to heat. In a nuclear powered facility, the solar thermal energy generated as described above, could be passed through the wall of a steam generator so as to augment the nuclear powered heating. The present invention may also be employed in a passive cooling system in a building, for example, where air is heated in the house, much like a furnace, or as a ventilation or cooling system by heating air in a duct that exhausts air up and out of the room/building. The heating of air in the duct would draw air out of the room/building, and if air intake is provided from a cool source, the ground for example, an effective means of cooling a room with heat can be created.

While the invention is susceptible to various modifications and alternative constructions certain illustrated embodiments have been shown in the drawings and accompanying detailed description. It should be understood however that there is no intention to limit the invention to the specific constructions disclosed herein. On the contrary the invention is intended to cover all modifications alternative constructions and equivalents falling within the scope and spirit of the invention.

What is claimed:

1. A solar generation system comprising:
   a solar radiation concentration component;
   an optical transmission component for transmitting concentrated solar radiation from the solar concentration component through an exterior wall of a heating vessel operating in a Rankine cycle and adapted to convert the solar radiation into heat inside of the heating vessel via a thermal distributor;
   a solar to thermal energy converter operatively coupled to the optical transmission component for receiving solar radiation transmitted thereby and converting the transmitted solar radiation to thermal energy; and,
   the thermal distributor being coupled to the solar to thermal converter for directing thermal energy from the solar to thermal converter to a medium to be heated so as to generate a heated medium.

2. In combination with the system of claim 1, and wherein the medium defines a working fluid, a boiler having boiler pipes for carrying the working fluid, the boiler being capable of converting the working fluid into a super-heated steam, the boiler further being capable of receiving the heated medium and transferring heat from the heated medium to the working fluid.

3. In combination with claim 2, a turbine for converting the super-heated steam to mechanical energy and exhausting cooled steam, and a condenser for condensing the cooled steam to liquid, the solar generation system further comprising a cooling component for transferring heat generated within the optical transmission component to a heat transfer fluid so as to cool the optical transmission component, and a component for directing the heat transfer fluid to the boiler, the boiler transferring heat from the heat transfer fluid to the working fluid.

4. The system according to claim 1, wherein the solar radiation concentration component comprises a collector for collecting concentrated solar radiation and directing the concentrated solar radiation to the optical transmission component.

5. The system according to claim 1, wherein the optical transmission component comprises a fiber-optic cable.

6. The system according to claim 5, further comprising a cooling component for transferring heat generated within the fiber-optic cable to a heat transfer fluid so as to cool the fiber optic cable, and for making the heat transfer fluid available to the heating vessel.

7. The system according to claim 1 wherein the medium is heated by means of a gas directed over the thermal distributor so as to generate a heated gas that is directed to the medium to be heated.

8. The system according to claim 7, further comprising a non-solar energy source capable of receiving the heated gas so as to pre-heat an intake gas to the non-solar energy source.

9. The system according to claim 7, further comprising a non-solar energy source capable of generating first heated gas, the thermal distributor being in thermal communication with the first heated gas to generate a second, hotter, heated gas.

10. The system according to claim 1 wherein the solar to thermal energy converter comprises a chamber in which the optical transmission has a termination connection for directing solar radiation carried thereby inside the chamber, the chamber comprising walls that substantially absorb, and convert the solar radiation to thermal energy and conduct the thermal energy to the heat exchanger device.

11. A method comprising:
concentrating and collecting solar radiation;
transmitting the collected solar radiation to a solar to thermal converter over an optical transmission medium through an exterior wall of a heating vessel operating in a Rankine cycle so as to convert the solar radiation into heat inside of the heating vessel via a thermal distributor;
converting the collected solar radiation to thermal energy at the thermal converter; and,
transferring heat from the solar to thermal converter via the thermal distributor to a medium so as to generate a heated medium.

12. The method according to claim 11 wherein the medium defines a working fluid, further comprising heating the working fluid by means of a non-solar energy source.

13. The method according to claim 12 further comprising producing super-heated steam in the vessel from the working fluid and using the super-heated steam to operate a turbine coupled to an electric generator.

14. The method according to claim 11, wherein the optical transmission medium comprises one of a fiber-optic, a light tube or a light guide.

15. The method according to claim 11, further comprising directing a heat transfer fluid around the optical transmission medium so as to cause heat from the optical transmission medium to be transferred to the heat transfer fluid, and directing the heated heat transfer fluid to the heating vessel.

16. The method according to claim 12, further comprising pre-heating a gas using the non-solar energy source and directing the pre-heated gas to the solar to the thermal converter.

17. The method according to claim 12, further comprising pre-heating a gas using the solar to thermal converter and directing the pre-heated gas to the non-solar energy source.

18. The method according to claim 11, further comprising directing a gas over the the thermal distributor, generating a heated gas, and directing the heated gas to the medium to be heated.

19. The system of claim 1 further comprising a fluid containment system and a combustion system, and arranged such that a gas may flow in series through the containment system, combustion system and thermal distributor.

20. The method of claim 11 further comprising passing a gas in series through a fluid containment system, a combustion system and the thermal distributor.

* * * * *